Inventor:
John H. Miller

June 13, 1933.   J. H. MILLER   1,913,766
METHOD AND APPARATUS FOR TESTING AUDION TUBE CIRCUITS AND DEVICES
Filed March 30, 1931   8 Sheets-Sheet 4

FIG. 4.

Inventor
John H. Miller
By Williams, Bradbury,
McCaleb & Hinkle
Attys

June 13, 1933.   J. H. MILLER   1,913,766
METHOD AND APPARATUS FOR TESTING AUDION TUBE CIRCUITS AND DEVICES
Filed March 30, 1931   8 Sheets-Sheet 5
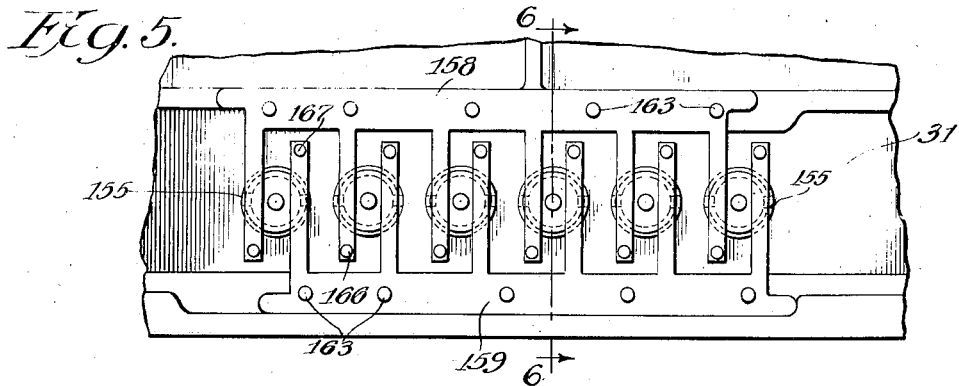
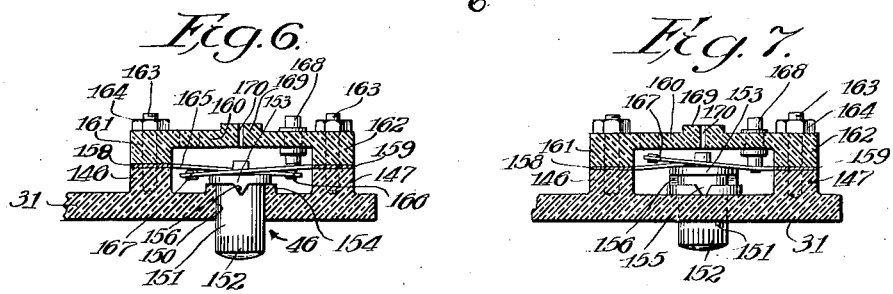
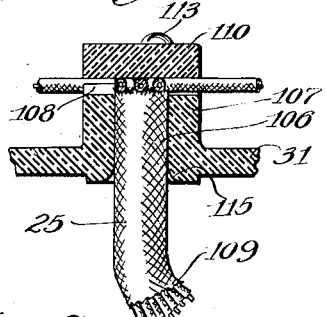
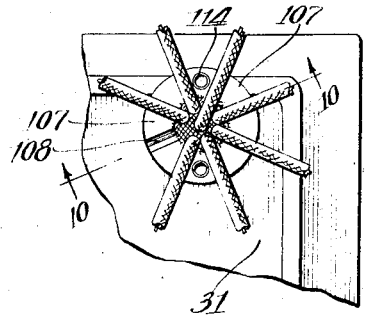
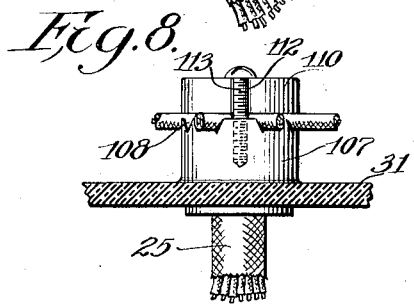
Inventor:
John H. Miller
By Williams, Bradbury, McCaleb & Hinkle, Attys.

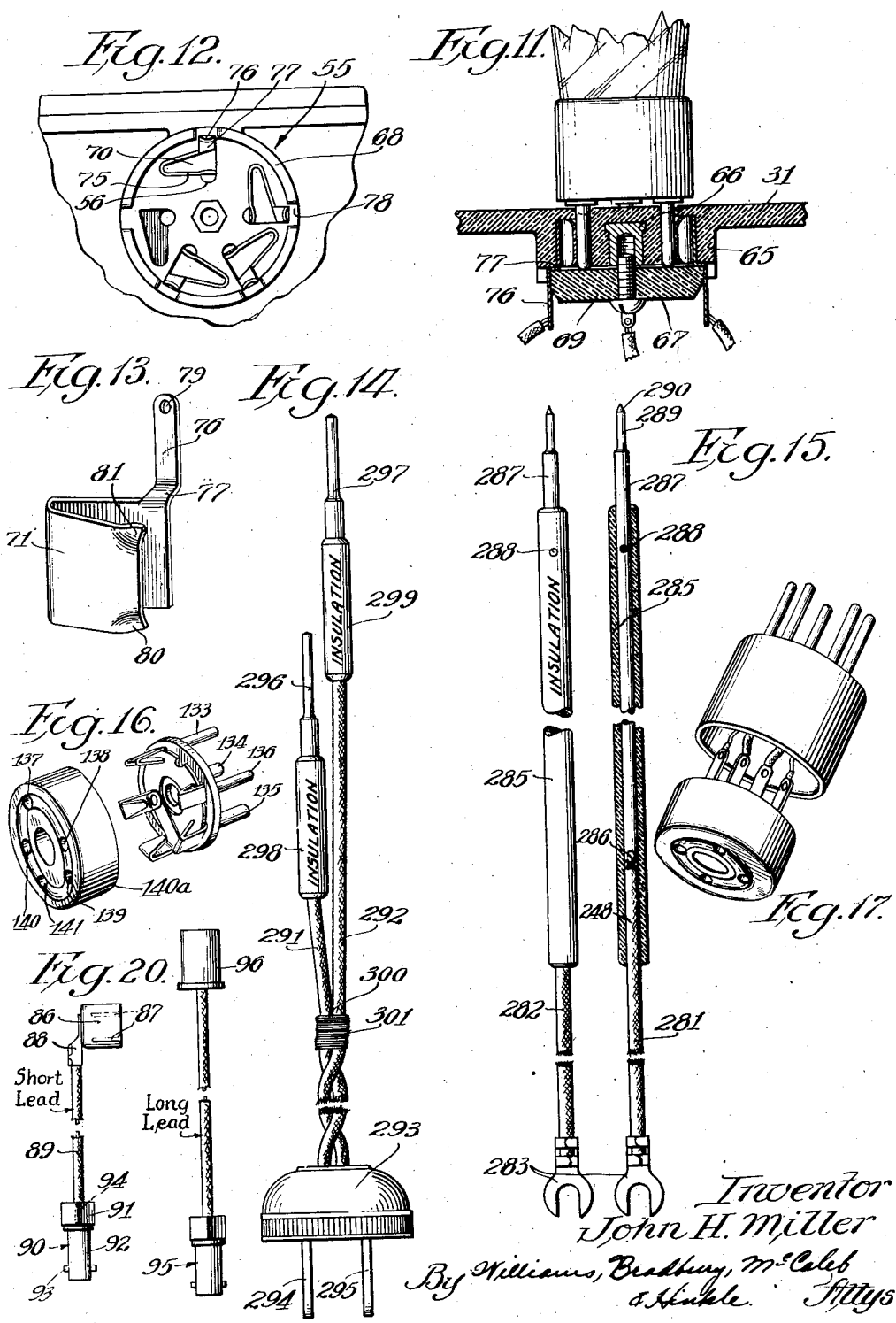

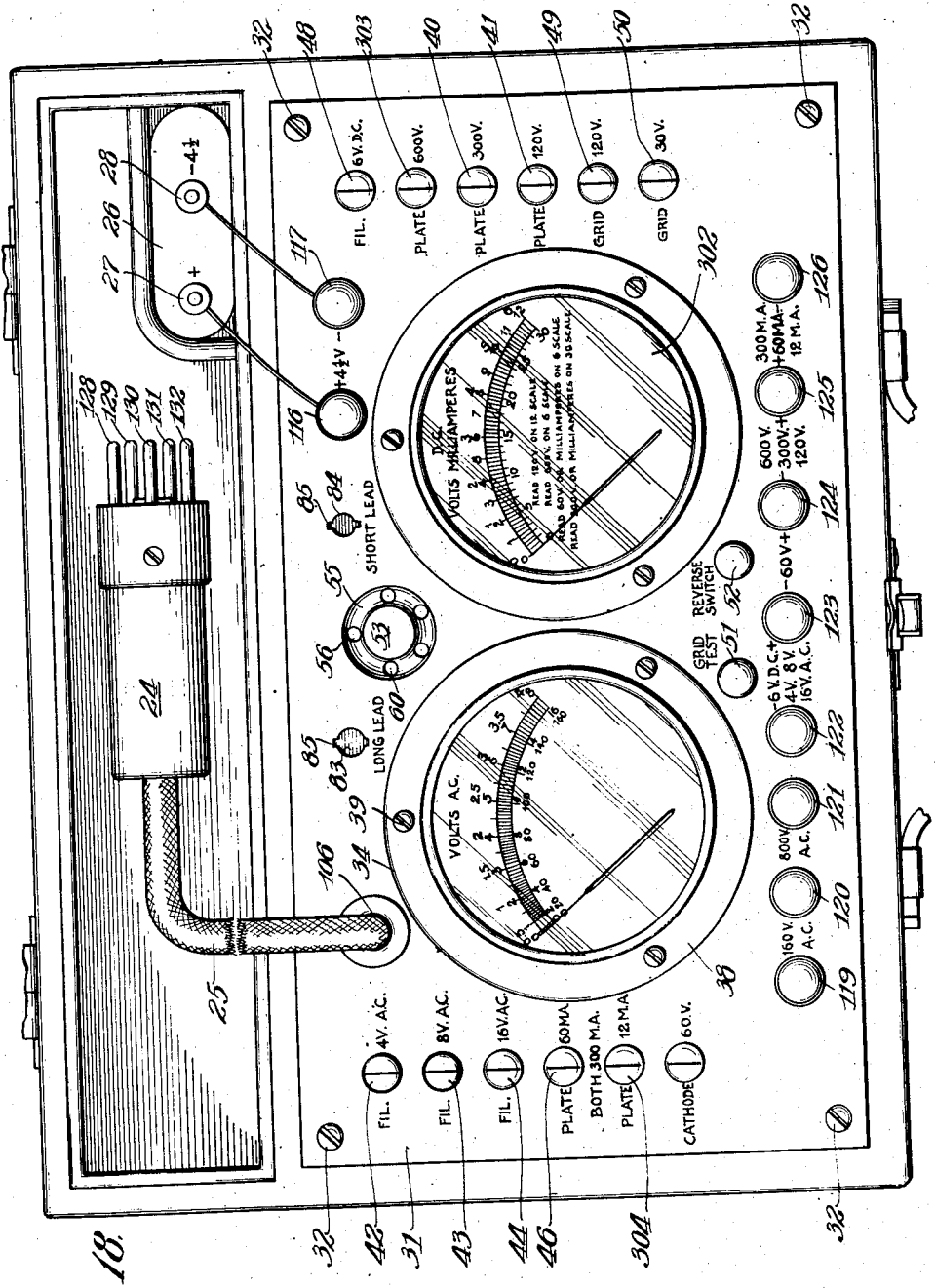

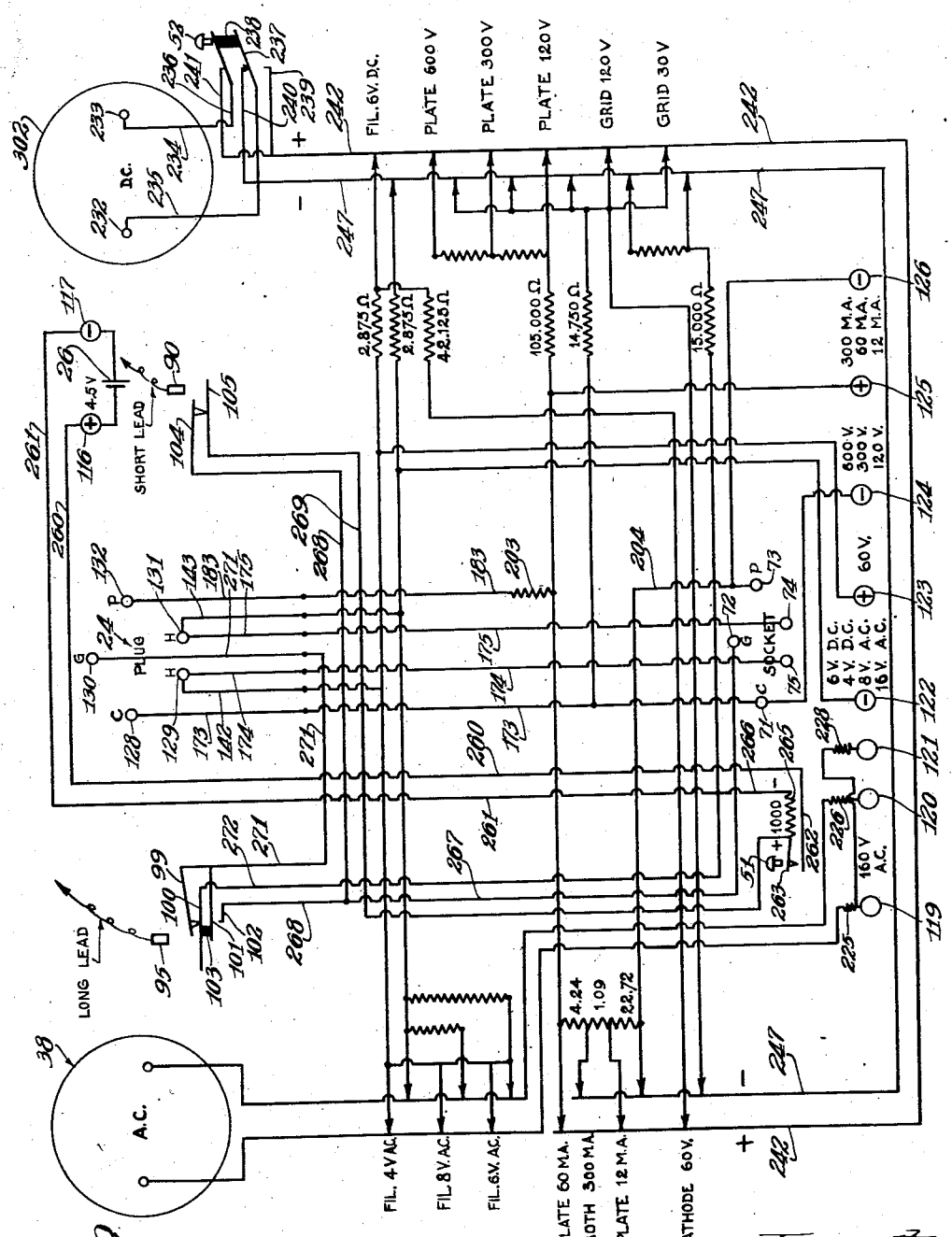

Patented June 13, 1933

1,913,766

UNITED STATES PATENT OFFICE

JOHN H. MILLER, OF OAK PARK, ILLINOIS, ASSIGNOR, BY MESNE ASSIGNMENTS, TO JEWELL ELECTRICAL INSTRUMENT COMPANY, A CORPORATION OF NEW JERSEY

METHOD AND APPARATUS FOR TESTING AUDION TUBE CIRCUITS AND DEVICES

Application filed March 30, 1931. Serial No. 526,158.

The present invention relates to methods and apparatus for testing audion tube circuits, such as radio receivers and radio apparatus of all kinds, such as thermionic tubes, circuits, transformers, lightning arresters, batteries, etc. The apparatus may also be used for testing various other types of electrical equipment, but it is peculiarly adapted to be used in testing the apparatus used in electron tube amplifying circuits.

It should also be understood that all of the features of the present invention need not be included in every embodiment of the invention, and many of the novel features of the present testing equipment may be used separately from the complete testing apparatus. The smaller or more simple testing device constructed according to the present invention need only include such improved features as it may be desirable to include in the lower priced testing devices, which are adapted only for performing a limited number of tests.

Modern radio receivers and radio apparatus have become so complex in structure and circuit arrangement, that the location, analysis and correction of trouble in a radio receiver has become an extremely difficult art, event for those who are skilled in the construction of receivers. The users of radio receivers have also become accustomed to higher standards of performance in radio receivers, and better tone quality, greater selectivity, greater sensitivity, better volume control and better standards of performance are now required.

The maintenance and servicing of modern radio receivers therefore necessitates the use of improved testing devices for locating the trouble in radio receivers, or for checking the electrical conditions existing in the receiver and assuring a high standard of performance.

One of the objects of the present invention is the provision of an improved and scientific method of testing radio receivers and the like, by means of which undesirable conditions or defects, and their causes, may readily be detected, located and corrected, with a high degree of certainty.

Another object is the provision of an improved method of correction of defects in a radio receiver or the like, which insures the location of the trouble and facilitates the correction of the defects, with a minimum amount of guesswork.

Another object is the provision of an improved method of checking or verifying the electrical conditions existing in a radio receiver or the like, whereby the maintenance of the various parts of the receiver in proper condition may be more readily effected, and whereby the condition of a receiver may be accurately determined.

Another object is the provision of an improved testing instrument for radio receivers, which is capable of performing all the tests necessary or desirable to be performed by a radio service man, and which is capable of use for carrying out any of the improved methods described herein.

Another object is the provision of a testing instrument for radio receivers and the like, which is capable of testing the receiver and its various parts under operating conditions, so that the actual operating condition of the receiver may be accurately determined and defects corrected.

Another object is the provision of a testing instrument which is equally adaptable to the testing of screen grid tubes, as well as the older forms of electron tubes, and which is capable of testing battery operated receiving sets, as well as sets which are energized from a source of alternating current.

Another object is the provision of an improved form of switching arrangement for testing instruments of the class described, whereby a limited number of instruments may be used to perform a large variety of different tests and functions.

Another object is the provision of an improved testing instrument of the class described, in which the separate instruments are so arranged that they are also adapted for use in other testing operations without affecting any of the other instruments, so that the separate instruments are also capable of general use.

Another object is the provision of a testing instrument for amplification circuits, by means of which simultaneous readings of filament or heater voltage, grid voltage, or plate voltage and plate current can be taken.

Another object is the provision of an improved method of measuring, recording and correlating data regarding electrical conditions in an amplifying circuit, whereby the conditions may be compared with standard or normal conditions, the state of the circuits and parts accurately determined, and suitable corrective steps taken, if necessary.

Another object is the provision of an improved molded panel construction for testing devices of the class described, whereby the devices may be manufactured at a lower cost and whereby the arrangement of instruments, switching devices, connectors and circuits may be made more compact and sturdy.

Another object is the provision of a plurality of improved accessories for use with a radio receiving set tester of the class described, whereby a number of other useful tests may be carried out.

Other objects and advantages of the invention will be apparent from the following description and from the accompanying drawings, in which similar characters of reference indicate similar parts throughout the several views.

Referring to the drawings, of which there are eight sheets;

Fig. 4 is a schematic wiring diagram of the testing device of Figs. 1, 2 and 3;

Fig. 5 is a bottom plan view of one of the switching arrangements, with its insulating cover plate removed;

Fig. 6 is a sectional view through one of the push button switches, taken on the plane of the line 6—6 of Fig. 5;

Fig. 7 is another sectional view of the same switch with the switch secured in closed position by rotation of the push button;

Fig. 8 is an elevational view of the cable conductor securing device, which forms a part of the supporting panel;

Fig. 9 is a bottom plan view of the cable conductor securing device, with one of the clamping elements removed, showing the arrangement of the separate conductors;

Fig. 10 is a sectional view of the cable conductor securing device, taken on the plane of the line 10—10 of Fig. 9;

Fig. 11 is a sectional view through one of the sockets carried by the instrument panel, taken on the plane of the line 11—11 of Fig. 1;

Fig. 12 is a bottom elevational view of the electron tube socket with the insulating cover removed;

Fig. 13 is a view in perspective of one of the contact members of the tube socket;

Fig. 14 is an elevational view of one of the accessories comprising a connector plug, leads, and jacks for testing the line voltage;

Fig. 15 is an elevational view in partial section of the continuity test leads with their connectors and jacks or probes;

Fig. 16 is an exploded view of an adapter used for changing the tester plug from a five-prong plug to a four-prong plug;

Fig. 17 is a similar view of an adapter used for changing a five-contact socket to a four-contact socket in the testing device;

Fig. 18 is a top plan view of the instrument panel of a modified testing device employing two measuring instruments;

Fig. 19 is a schematic wiring diagram of the testing device of Fig. 18;

Fig. 20 is an elevational view of the leads used with screen grid tubes.

Figure 2:
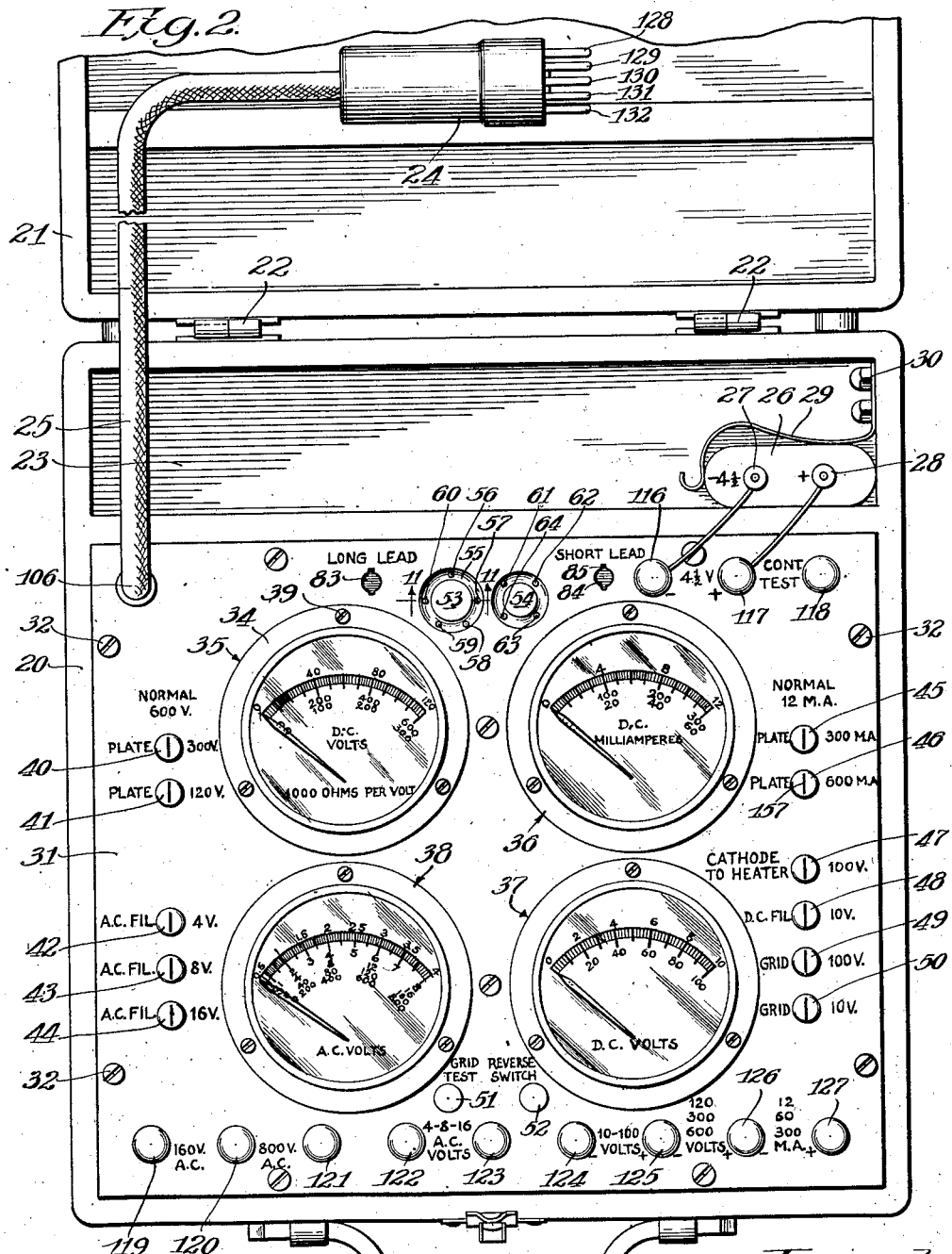
Fig. 2 is a plan view of the present testing device showing the various measuring instruments, push button switches, sockets and other parts.

Referring to Fig. 2, this is a plan view of one of the preferred embodiments of the radio set and tube tester in the form of a portable instrument. It should be understood that the present device may be embodied in a panel type instrument adapted to be permanently mounted in a laboratory, shop, or the like, or the devices may be carried by a panel which is suitably mounted and enclosed in a casing 20.

The casing 20 preferably consists of a casing made of wood or other insulating material, provided with a cover 21 secured to the casing 20 by hinges 22, and the casing is preferably provided with an auxiliary chamber 23 for receiving the test plug 24, cable 25, standard battery 26 and other accessories, such as adapters, test leads, etc., to be used with the tester.

The standard battery 26 may consist of an ordinary four and one-half volt dry cell of the type used for flash lights, but provided with a pair of binding posts 27 and 28. The cell 26 may be secured in casing 20 by a resilient metal arm 29 which is curved to fit about the cell 26, and which is fixedly secured to the wall of the casing 20 by a plurality of screw bolts 30, in such manner that the cell 26 is clamped between the spring 29 and the side of the casing 20.

The panel 31 upon which the testing devices are mounted, may be secured in the casing 20 by a plurality of screw bolts 32 which pass through the panel 31 and are threaded into supporting studs carried by the casing 20, thereby fixedly securing the panel in the casing 20.

The panel 31 preferably consists of an integral molded member formed of a phenolic condensation product and provided with integral molded formations and indicia molded in the panel for performing the functions described hereinafter.

Figure 3:
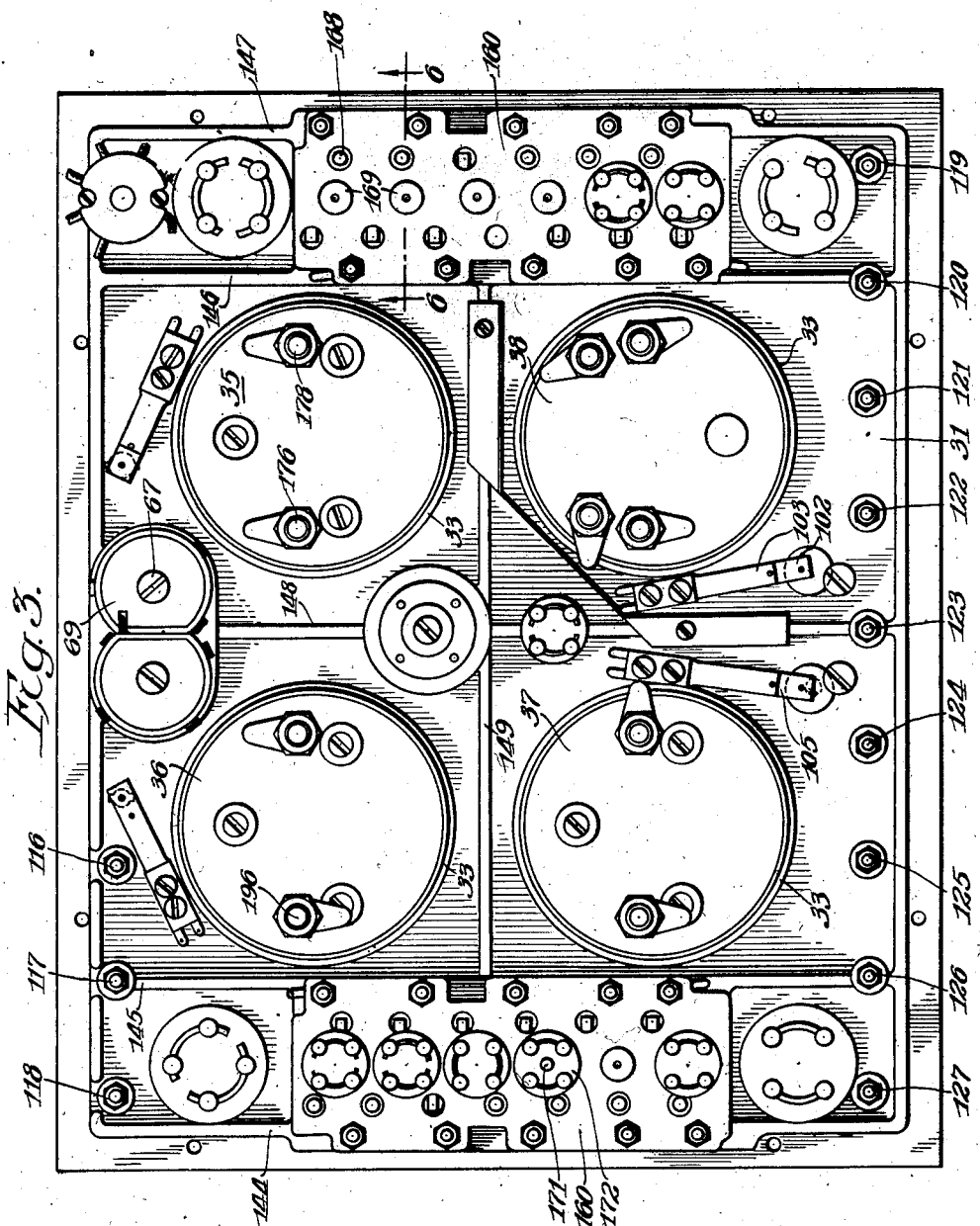
Fig. 3 is a rear plan view of the mounting panel with the wiring removed, showing the various instruments, switches, resistances, etc., arranged on the rear side of the panel.

The panel 31, a bottom view of which is shown in Fig. 3, is thus preferably provided with apertures 33, for receiving a plurality of electrical instruments, preferably of the flush type and having securing flanges 34 which are secured to the panel 31. The bodies of the electrical instruments 35, 36, 37 and 38, pass through the apertures 33 and are enclosed by the panel 31 and casing 20.

The instruments may be secured to the panel 31 by a plurality of metal screw bolts 39 which pass through holes in the attaching flanges 34 of each instrument, and are threaded into the molded insulating material, the threads of the screw bolts 39 directly engaging threads formed in the molded insulating panel 31.

In order to utilize the instruments 35—38 for a multiplicity of purposes, the instruments are preferably normally disconnected from the circuits of the testing device, and the connections are preferably controlled by a multiplicity of switching devices such as the switches which are actuated by the push buttons 40 to 50, inclusive. The instruments are preferably systematically arranged with respect to the push buttons controlling the particular instrument connections, and therefore the push buttons 40 and 41 are adjacent the instrument 35; the push buttons 45 and 46 adjacent the instrument 36; the push buttons 42 to 44 adjacent instrument 38 and the push buttons 47 to 50 adjacent instrument 37. A pair of auxiliary push buttons 51 and 52 are also provided for use in special tests, the push button 51 being for the grid test and push button test 52 for the reversing switch, respectively.

The panel 31 is preferably provided with one or more integral socket formations 53, 54, for receiving audion tubes of the type having five contact prongs and four contact prongs, respectively. It will be understood that any number of contacts can be provided for engagement with any type of electron tube, but for the present uses, the sockets illustrated may be sufficient, particularly when used with the various adapters and auxiliary leads, which enable the sockets to take care of screen grid tubes, rectifier tubes, or any of the ordinary types of tubes, including UV, UY or UX tubes.

The panel 31 is preferably provided with a circular groove 55 within which are located the apertures 56 to 60, and 61 to 64, for passing the prongs of the five prong and four prong tubes, respectively. The circular groove 55 facilitates the location of the prongs in circumferential alignment with the apertures 56—65, after which the tube can be conveniently inserted by merely rotating the tubes until the prongs register with the proper apertures.

Referring to Figs. 3 and 11 to 13, the structure of one of the panel sockets is illustrated in detail in these figures. The panel 31 is preferably formed with a downwardly extending boss 65 which may be substantially cylindrical in shape, and which is preferably provided with a centrally located metallic member 66 molded in the boss 65 and fixedly secured therein for receiving a screw bolt 67.

The boss 65 is preferably provided with a peripherally extending flange 68 adapted to receive the molded insulating cover plate 69 and the cover plate 69 may be secured in place by screw bolt 67 passing through cover plate 69 and threaded into the metal member 66. The boss 65 is, of course, provided with circular apertures, in the present instance communicating with the apertures 56 to 60, appropriately located to register with the terminal contacts of a five prong tube, and the apertures 56—60 lead to recesses 70 which are preferably substantially triangular in shape, and which communicate with one side of the elongated circular apertures 56—60.

The socket 55 is preferably provided with a plurality of contacts of the type shown in Fig. 13, comprising a resilient sheet metal member which is bent back upon itself to form a substantially V-shaped member having a depth equal to the depth of the recesses 70, and adapted to fit within the substantially triangular recess 70. The contacts 71 to 75 preferably have an upwardly extending strip 76 formed with an offset 77, and the peripherally extending flange 68 may be provided with a plurality of cutouts 78 for receiving the connector strips 76, which may be provided with apertures 79.

The corners 80, 81 of the contacts 71—75 are preferably turned inward towards the other side of the contact, and away from the circular apertures 56—64, so that the corners 80, 81 form camming surfaces against which the prongs may engage to cam the resilient part of the contacts 71—75 back as the prongs enter the apertures 56—64. The contacts may be permanently secured in the recesses 70 by the cover plate 69, which clamps the offset portions 77 against the end of the boss 65, permitting the connector strips 76 to extend outward beyond the cover 69.

The four contact sockets are of course formed in a similar manner with apertures of appropriate size, for receiving the large and small terminal prongs on the tubes, and the two sockets may have their respective filament, grid and plate contacts connected in parallel, so that either socket may be used, the other socket being on open circuit by virtue of the absence of an appropriate tube.

Referring again to Fig. 2, the panel 31 is also preferably provided with a pair of sockets 83 appropriately designated "long lead" and "short lead", for receiving the leads and connectors which are to be used with screen grid tubes, and the sockets 83, 84 are preferably cylindrical in form with laterally projecting recesses 85 at the opposite sides to pass the complementarily shaped connectors on the screen grid leads, shown in Fig. 20.

Referring to Fig. 20, the short lead for screen grid tubes, is preferably provided with a cap 86 consisting of an integral sheet metal member formed into a cylindrical cap with slits 87 in its sides. The top of the cap 86 is formed into a tubular rivet which is fixedly secured to a connector 88 that is soldered to the lead 89. The other end of the lead preferably bears a connector 90, which may be formed with a non-circular or hexagonal thumb piece 91 and a cylindrical body 92 having a pin 93 passing through the body. The connector 90 has a centrally located bore 94 into which the conductor of the lead 89 passes and the conductor 89 is brazed or soldered inside the cylindrical body 92.

The long lead is provided with a similar connector 95 at one end for passing through the socket 83, and at the opposite end with a connector 96 consisting of a substantially cylindrical body adapted to fit within a cap like the cap 86, the particular cap in question being that already installed upon the radio receiving set.

The socket 83 for the long lead and the socket 84 for the short lead, are preferably made of different size, each to fit the appropriate connectors 95 and 90, respectively, so as to prevent the possibility of placing the long lead connector in the short lead socket and vice versa.

Referring to Fig. 3, the panel 31 preferably supports on its lower side, appropriate switching devices indicated in their entirety by the numerals 97 and 98 below the sockets 83 and 84.

The switching device 97 for the long lead, preferably consists of a plurality of resilient contact blades 99, 100, 101 and 102, the contacts 100 and 101 being joined by an insulating member 103. The contact 100 is normally urged into engagement with the contact 99, but when the connector 95 is inserted in the socket 83 to a sufficient depth to bring the pin 93 below the panel 31, the connector 95 not only makes connection with the contact 100, but it brings the contact 101 into engagement with the contact 102, and breaks connection between the contacts 99 and 100, for a purpose to be described hereinafter. The connector 95 may then be rotated to a position at right angles to the position of insertion so that the pin 93 will engage the lower side of the panel 31, and the connector 95 will be retained in the socket 83, being held with the pin against the bottom of the panel by the resilient action of the contacts 100, 101.

In a similar manner, the connector 90 on the short lead may be inserted in the short lead socket 84 and rotated to break the connection between the contacts 104 and 105, and to effect a connection between the connector 90 and contact 105.

The circuits are thus changed from the proper circuit arrangement for a test of an ordinary audion tube, to the proper circuit arrangement for the testing of a screen grid tube, and the testing operation will be described in detail hereinafter.

The panel 31 is also preferably formed with an opening 106 for passing the cable 25 which is connected to the test plug 24. The opening 106 is surrounded on the lower side of the panel with an integral boss 107, which is preferably provided with a plurality of radially extending grooves 108 leading from the bore 106.

The cable 25 preferably consists of a plurality of separately insulated flexible electrical conductors, such as a plurality of fine copper wires twisted together and covered with rubber and a braided covering. The separate conductors are secured together to form an integral cable by the use of an outer braided covering 109, which extends from the test plug 24 into the bore 106. At the lower end of the bore 106 the separate conductors of the cable 25 are splayed out in a radial direction, one conductor being located in each of the grooves 108, and the separate conductors of the cable 25 are clamped in the groove 108 by a molded insulating clamping member 110. The clamping member 110 is provided with a radially extending groove 112 at each side for receiving the threaded screw bolt 113, which is threaded into a threaded bore 114 in the boss 107.

The separate conductors for the cable 25 are thus spread out in a radial direction underneath the panel 31 for convenient attachment to the conductors or wiring circuits which lead to the electrical instruments and controlling switches, and at the same time the cable is secured to the panel in such a manner that there is no possibility of a pull on the cable tearing loose the electrical connection between the conductors of the cable and the testing device.

The bore 106 is preferably provided with a rounded or tapered surface 115 at the point where the cable emerges from the panel 31, thereby preventing the possibility of the forming of sharp bends in the cable or the wearing off of the cable at the place where it emerges from the panel.

Referring again to Fig. 2, the panel 31 is also preferably provided with a plurality of binding posts for connection of the cell 26 to the circuits and for using the testing device in continuity tests. These binding posts comprise the binding posts 116, 117, 118 at the top of Fig. 2.

The panel 31 also preferably supports a plurality of other binding posts directly connected to the instruments 35—38, and adapted to be used when it is desired to use the instruments separately on any of the ranges. These are the binding posts 119 to 127, located at the lower end of Fig. 2. All of the binding posts are preferably of the type having non-removable clamping nuts with an insulating covering, the posts being fixedly secured to the panel 31 and connected to the appropriate circuits beneath the panel.

The cable 25 preferably terminates in a test plug 24 which has a plurality of contact prongs corresponding to the contact prongs of a five prong electron tube. Thus the test connector 24 is provided with contact prongs 128 to 132, corresponding to the grid contact, plate contact, cathode contact and heater or filament contacts. When the test plug 24 is to be inserted in a socket having four contacts for a four prong tube, the test connector 24 is used with an adapter of the type shown in Fig. 16.

The adapter 140a shown in Fig. 16, comprises an insulating body which is provided with a plurality of female contacts at one end for engagement with the prongs 128—132 of the test plug 24, and provided at the other end with four male contact prongs 133 to 136 corresponding to the four contacts of a four prong electron tube. The female filament contacts 137, 138 are connected to the male filament contacts 133, 136 of the adapter 140, and the cathode female contact 139 may be connected to either side of the filament at contacts 133 or 136. The female plate and grid contacts 140, 141, are connected to the male plate and grid contacts 134, 135, respectively, of the adapter.

It will thus be observed that by the use of an adapter 140a of the type shown in Fig. 16, the test plug 24 may be converted from a five prong test plug to a four prong test plug, since the cathode may be connected to one of the sides of the filament for the purpose of carrying out the ordinary tests.

The tube which is removed from the socket under test is placed in the appropriate socket 54 of the testing device, connections being made to all of the electrodes of the tube, and the receiving set may be operated in the usual manner so that the presence of the extra cathode conductor in the cable does not affect the testing operation when a four prong tube is used.

The cable 25 may comprise a single conductor for each of the contact prongs 128—132, the conductors being made of sufficient size so that the drop in voltage in the cable may be disregarded, or the standards which are given for comparison may take into consideration the voltage drop in the cable.

Referring to Fig. 4, the cable 5 may be provided with a pair of auxiliary leads 142, 143 extending from the heater or filament prongs of the plug 24, to the voltmeter, and controlling switches, for the purpose of permitting the voltmeter to read the voltage at the socket of the receiving set, without the error that would be caused by the potential drop in the filament leads of the cable 25. The filament circuit being that which draws a relatively large current, the potential drop in the filament leads, which is due to this current, must be taken into consideration and added to the reading which is taken at the socket 53 or 54, in order to secure the voltage at the plug 24, if the auxiliary voltage leads 142, 143 are not employed. The seven conductor cable is therefore adapted to facilitate the measurement of the conditions at the socket of the radio receiver more accurately.

The panel 31 is also preferably provided with a plurality of integral transversely extending ribs 144—149 for the purpose of strengthening the panel and also for the purpose of supporting the switching devices for controlling the connections of the instruments 35—38.

Referring to Figs. 6 and 7, one of the push button switches 46 is illustrated in detail in these figures. The panel 31 is provided with a bore 150 adapted to receive the substantially cylindrical push button 151. The push button 151 is preferably provided with a knurled or milled surface 152, located adjacent its exposed end, to be engaged by the fingers in turning the push buttons, and the opposite end of the push button is provided with a radially projecting flange 153.

The panel 31 is provided with a downwardly projecting annular flange 154 surrounding the bore 150 for each push button, and the annular flange 154 is preferably formed with a groove 155 which may be of substantially V-shape. The push button 151 is also provided with an axially extending V-shaped projection 156 on one or both sides of the push button, adapted to be received in the V-shaped groove 155 when the push button is in the position of Fig. 6. The push button may be simply pushed to actuate the switches controlled by it, or it may be pushed and turned to the position shown in Fig. 7, in which case the projections 156 ride up out of the grooves 155 and come into engagement with the annular flange 154, where they are held by the resilient pressure of the contact springs.

Referring to Fig. 2, each of the push buttons is preferably provided with an indicating line which may consist of a transverse groove in the end of the push button, the groove being filled with plastic material of a contrasting color, such as white printers' wax. When the line 157 extends vertically in Fig. 2, the push button is in the rotative position of Fig. 6, so that it may be pushed to closed circuit position, but it will immediately return upon release of the pressure on the push button. When, however, the line 157 of any push button extends transversely to the usual direction, the push button is in the position of Fig. 7, permanently retained in the closed circuit position until rotated and released by the operator.

It will thus be observed that the switching devices are preferably arranged so that they are all on open circuit and normally maintained in open circuit to prevent any possibility of the closing of several circuits inadvertently, but if desired, any test button may be secured in the closed circuit position, and its position is readily indicated by the indicating line on the push button.

The use of push buttons facilitates the taking of any tests separately without the necessity for moving the switch contacts through every one of the other tests which happen to be mounted on the same switch, and the use of separate switches thus eliminates much wear and tear on the instruments, which otherwise are compelled to indicate each one of a plurality of successive values in moving the switch to the desired position, even though only a single test may be desired. The push button system thus constitutes a truly selective system of conducting the tests in the order in which the push buttons are arranged, or any particular test may be selected without utilizing any of the other tests.

The conductors of the respective circuits are preferably systematically arranged to reduce the number of wires to a minimum, and consequently it happens that a number of the test leads may be connected to contact strips 158, 159 (Fig. 5), which are provided with a plurality of resilient contacts. The transverse ribs 144–147 may be utilized for supporting the contact strips 158, 159 and similar contact strips may be supported by the ribs 146, 147.

Each of the banks of push buttons is thus provided with one or more contact strips 158, 159, as shown in Fig. 6, and the contact strips may be clamped in proper position by a molded insulating bridge plate 160, which is provided with longitudinally extending ribs 161, 162. Threaded studs 163 are fixedly mounted on the ribs 146, 147 by molding the studs 163 in the lower side of the panel 31, and the bridge plate 160 may be provided with apertures registering with the studs 163 and secured in place by a plurality of nuts 164.

Each of the contact strips 158 is preferably provided with one or more laterally projecting resilient contact blades 165, 166, having a contact 167 fixedly secured thereto at its end, and the bridge 160 may be provided with a plurality of fixed contact studs 168 located to register with the contacts 167. The fixed contacts 168 are likewise embedded in the bridge plate 160 by molding the fixed contacts 168 in the bridge plate.

When the push button 151 is in the position of Fig. 6, the resilient contact blade 166 is out of engagement with the fixed contact 168, but when the push button is pushed inward or pushed and turned to the position of Fig. 7, the contact 166 is brought into engagement with the fixed contact 168.

The bridge plate 160 is also preferably provided with a multiplicity of laterally projecting cylindrical bosses 169 having centrally located apertures 170, and threaded to receive the threaded ends of screw bolts 171 which secure a plurality of resistance spools 172 to the bridge plate 160 and panel 31. The spools 172 may be constructed substantially as shown in prior Patent No. 1,704,151, issued to Ray Simpson on March 5, 1929, and I am thus enabled to locate the respective multiplying resistances for use with the instruments 35–38 in convenient proximity to the controlling switches so as to make the connections as short as possible.

Each one of the banks of push button switches may be constructed substantially as that just described, and consequently it is deemed unnecessary to describe each of the push button switches in detail, but the respective functions of the push buttons will be described in detail with respect to the instruments and circuits used with them.

Referring to Fig. 4, this is a schematic diagram of the wiring circuits for the testing device shown in plan in Fig. 2.

The cathode prong of the test plug 24 may be directly connected by a conductor 173 to the female cathode connector of the socket 53. The heater prongs 129 and 131 of plug 24 may be directly connected to the female heater contacts 75 and 74, respectively, of the socket 53 by conductors 174 and 175, respectively. The heater circuit of a tube placed in the socket 53 is thus adapted to be directly energized from the appropriate heater circuits of the receiving set when the test plug 24 is placed in connection with the socket from which the tube was removed, and the cathode of the tube is also connected to the cathode circuit of the receiving set.

The grid and plate circuits of the socket 53 are preferably not directly connected to the contact prongs of the plug 24, for the purpose of permitting the impressing of different potentials upon the grid, and in order to place current measuring instruments in the plate circuit.

The four contact socket 54 may have its filament contacts 63 and 64 permanently connected in parallel with the heater contacts 75 and 74, and it may have its grid and plate contacts 61 and 62 permanently connected with the grid and plate contacts 72, 73 of the five prong socket 53.

The upper left-hand meter 35 preferably consists of a D. C. voltmeter having appropriate ranges for the measurement of the plate voltages of various types of tubes, and also for the purpose of checking the line voltage of an ordinary lighting circuit from which modern radio receivers are energized. Thus, the meter 35 is provided with scales of 0–120, 0–600 and 0–300 volts, and the panel is provided with indicia indicating that the instrument is normally connected across the 600 volt range, but the push buttons 40 and 41 may be used for measuring plate voltage on the 300 volt scale or the 120 volt scale, respectively.

The negative terminal 176 of the direct current voltmeter 35 is connected by a conductor 177 to the cathode conductor 173. The positive terminal 178 of the direct current voltmeter 35 is connected by a conductor 179 to a resistance 180. The resistance 180 is connected to a second resistance 181 which is connected to a return conductor 182, which is connected to the plate terminal 132 of plug 24 by a conductor 183. The voltmeter 35 is thus normally connected across the cathode and plate circuits of the plug 24 and socket 53 through the resistances 180 and 181, which constitute an appropriate multiplying resistance for the use of the voltmeter 35 on the 600 volt range.

All of the instruments used in the present testing device preferably have a resistance of 1000 ohms per volt, thereby constituting a standard instrument for the checking of B batteries and B socket power units, since the resistance is so high that no trouble will be had due to excessive current drain through the meter. The provision of meters having a resistance of exactly 1000 ohms per volt, also facilitates the convenient calculation of all of the constants of the circuit when the meters are used and when it may be necessary to take the resistance of the meter into consideration.

A conductor 184 extends from the common terminal 185 of the resistances 180 and 181 to the fixed contact 186 which is adapted to be engaged by the resilient contact 187 actuated by the push button 40. The other terminal 188 of resistance 181 is connected to a resistance 189, the other terminal of which is connected to fixed contact 190, adapted to be engaged by resilient contact 191 actuated by push button 41.

The movable contacts 187 and 191 are joined by a conductor 192 and connected by a conductor 193 to the conductor 179. The resistance 180 may have a value of 300,000 ohms, the resistance 181 of 300,000 ohms, and the resistance 189 of 150,000 ohms when used with a voltmeter having a resistance of 1000 ohms per volt. When the push button 40 is actuated, the contact 187 is brought into engagement with contact 186 and half the resistances 180, 181 are short-circuited, thereby placing only 300,000 ohms resistance in circuit with the voltmeter to facilitate the use of the 300 volt scale for the measurement of plate voltages on this scale.

When the contact 191 is moved by push button 41 into engagement with contact 190, both the resistance 180 and 181 are short-circuited, and the resistance 189 is placed in circuit with the voltmeter 35 for the use of the voltmeter in measuring plate voltages which are within the range of 120 volts.

Since the meter is normally connected on the 600 volt scale, which is the largest scale, the meter is protected against excessive voltages, and the buttons, bringing the lower ranges into circuit, need not be pressed unless the 600 volt scale reading indicates that the voltage value is such as can be measured on the lower scales. The preferred method of operation of the buttons consists in using the highest scale first and only connecting the lower scale ranges in circuit after it has been ascertained that the instrument can indicate the voltage on those scales.

In order that the D. C. voltmeter may also be used for making other measurements without reference to the plug 24 and socket 53, the binding post 125 is connected by a conductor 194 to the cathode conductor 173, and thence through conductor 177 to the negative terminal 176 of meter 35. The binding post 126 is connected by a conductor 195 to the conductor 182, which connects through the resistances 181 and 180 and conductor 179 to the plus terminal 178 of the voltmeter 135. Between the binding posts 126 are appropriate indicia, such as a minus sign at the right on the binding post 125, and a plus sign at the left of the binding post 126, and the numerals 120, 300 and 600 volts, indicating that these binding posts may be used for the measurement of direct current voltages of these values, by appropriate connection to the minus and plus binding posts.

It will be noted that the switches 187 and 191 are operative for placing appropriate multiplying resistances in circuit with the binding posts 125 and 126, and the meter 35 in the same manner as when the meter was used for measuring various plate voltages.

The upper right-hand meter 36 preferably consists of a direct current milliammeter having appropriate ranges for the measurement of the plate currents of various types of tubes, including screen grid tubes and rectifier tubes. For this purpose, the meter is provided with a 0–12, a 0–300 and a 0–60 milliampere scale, and the panel 31 is provided with appropriate indicia, such as "Normal 12 M. A.", "Plate 300 M. A." and "Plate 60 M. A." adjacent the push buttons 45 and 46, respectively, for indicating the push button which should be used for measuring plate currents of the corresponding value.

The negative terminal 196 of the D. C. milliammeter 36 may be connected by conductor 197 to the conductor 182, which is in connection with the plate contact 132 of plug 24 through conductor 183. The conductor 182 is connected to the resilient contact 198, adapted to engage the fixed contact 199, being actuated by the push button 45.

The fixed contact 199 is connected through a shunting resistance 200, which may have a resistance value of 0.5 ohms and the opposite terminal of the shunt 200 is connected by a conductor 201 and a conductor 202 to the positive terminal of the D. C. milliammeter 36. The conductor 201 is connected through a resistance 203 to a conductor 204, which leads to the plate contact 73 of the socket 53. The conductor 182 also connects to a resilient contact 205, which is adapted to be engaged with the fixed contact 206 by the push button 46. The fixed contact 206 is connected through a shunting resistance 207, which may have a value of three ohms to the conductor 201, and thence to the positive terminal of the milliammeter 36.

It will thus be observed that the milliammeter 36 is directly interposed in the circuit between the plate contact 132 of the plug and the place contact 73 of the socket, the circuit through the milliammeter being traced as follows: 132, 183, 182, 197, 196, 202, 201, 203, 204, 73. The milliammeter 36 is thus normally connected to indicate the plate current on a 12 milliampere scale, but when the push button 45 is actuated, contact 198 is brought into engagement with contact 199 and resistance 200 is placed in shunt with the milliammeter 36, thereby shunting a portion of the current and permitting the measurement of currents on the 300 milliampere scale, the scale having been calibrated with the resistance 200.

In a similar manner, the three ohm shunt 207 may be brought into circuit by pushing the push button 46 to connect contacts 205, 206, and the plate current may be read on the sixty milliampere scale.

In order to permit the separate use of the D. C. milliammeter 36, the binding post 127 is connected by a conductor 208 to the conductor 201. The binding post 126 being connected by conductor 195 to the conductor 182, the binding posts 126 and 127 are placed in series with the milliammeter 36 for convenient use of the milliammeter for ordinary measurement of currents apart from the plug and socket of the testing device.

It should be understood that the plug will be removed from the socket of a receiving set when the instruments of the present device are intended to be used separately, and the socket 53 will be on open circuit without a tube in the socket.

The lower left-hand instrument 38 preferably consists of an A. C. voltmeter having a plurality of terminals and ranges for the purpose of measuring filament voltages and also checking various other high alternating current voltages used with radio receiving sets. Thus, the A. C. voltmeter 38 is provided with a 0.5–4, 0–8, 0–16, 0–160 and 0–800 scales for use with the corresponding push buttons and binding posts. The push button 42 is used for testing A. C. filament voltages up to four volts as indicated, the push button 43 for A. C. filament voltages up to eight volts, and the push button 44 for A. C. filament voltages up to sixteen volts.

The terminal 209 of the A. C. voltmeter 38 is connected by conductor 210 to the auxiliary voltage lead 143 leading to the heater or filament contact 131. The other filament contact 129 is connected through auxiliary voltage lead 142 to the fixed contact 211. The voltage lead 142 is also connected through resistance 212 to fixed contact 213, and through resistance 214 to fixed contact 215.

The other terminal 216 of A. C. voltmeter 38 is connected through conductor 217 to the resilient contacts 218, 219, 220, adapted to engage the contacts 215, 213, and 211, respectively. The push buttons 42—44 may thus be actuated when the plug is in the socket of the receiving set and the tube in the socket of the tester to indicate the filament voltage on the appropriate scale, and it is preferable that the push buttton corresponding to the larger scale be actuated first in order to indicate whether the voltage will read on scale unless the operator is familiar with the filament voltage for the particular tube.

The high voltage terminals 221 and 222 are connected by conductors 223 and 224 to the binding posts 119 and 120, respectively, through the resistances 225 and 226. These resistances are such that the binding posts 119 and 120 may be used for the 120 volt scale of the A. C. voltmeter 38.

A conductor 227 connects the binding post 119 to binding post 121 through resistance 228. When the binding posts 120 and 121 are used, all three of the resistances 228, 225 and 226 are in circuit for the use of the voltmeter on the 800 volt range and appropriate indicia, "160 V A. C." and "800 V A. C." are located between the respective binding posts as shown.

In order to permit the use of the 4, 8 and 16 volt ranges of the A. C. voltmeter 38, the binding post 122 is connected by conductor 229 to conductor 142, and the binding post 123 is connected by conductors 230 and 231 to conductor 210. The binding posts 122 and 123 are thus placed in series by contacts controlled by push buttons 42—44, so that the instrument 38 may be used apart from the plug and socket of the tester for measuring external voltages of the lower ranges.

The lower right-hand meter preferably consists of a direct current voltmeter having ranges of 0–10 and 0–100 volts for the measurement of grid voltages, direct current filament voltages and the cathode voltages. In order to assure the correct connection of the direct current voltmeter 37 in the circuit, the positive and negative terminals 232, 233 of the D. C. voltmeter 37, are connected by conductors 234 and 235, respectively, to the resilient contacts 236 and 237.

The resilient contacts 236 and 237 are joined by an insulating member 238 and are adapted to be brought into engagement with the contacts 239, 240 and 241 by actuating the push button 52. The contacts 237 and 236 are ordinarily urged into engagement with the contacts 240 and 241, but upon pressing the push button 52 the circuit is broken between the contacts 237, 240 and between contacts 236 and 241, and circuit is made between 239 and 237 and between 240 and 236.

A conductor 242 extends from the contact 240 to the resilient contacts 243—246, which are actuated by push buttons 47—50. A conductor 247 extends from the voltage lead 143 of the heater or filament contact 131 to the fixed contact 248, through a resistance 249 which may have a value of 5000 ohms.

A conductor 250 extends from fixed contact 248 through resistance 251, which may have a value of 90,000 ohms to a fixed contact 252.

A conductor 253 extends from the contact 241 of the reversing switch through resistance 254 of 5000 ohms to the cathode lead 173.

When the push button 47 is actuated to bring contacts 243 and 252 into engagement, the D. C. voltmeter 37 is placed across the cathode and heater circuits to measure the voltage from the cathode to the heater on the 100 volt range, and the circuit may be traced as follows: cathode contact 128, 173, 254, 253, 241, 236, 234, 232, 233, 235, 237, 240, 242, 243, 252, 251, 250, 249, 247, 143, 131. If a cathode voltage is encountered which causes a reverse reading due to the fact that the cathode is positive with respect to the heater, the reverse switch button 52 should be pressed also, which will cause the meter to read forward on its scale.

When the push button 48 is pressed, the direct current filament voltage will be indicated on the 10 volt scale of the D. C. voltmeter 37, the voltmeter being placed across the terminals of the filament and the circuit may be traced as follows: filament contact 131, 143, 247, 249, 248, 244, 242, 240, 237, 235, 233, 232, 234, 236, 241, 253, 254, 173, 128. It should be understood that for this reading the plug will be used with an adapter which connects the cathode to one side of the filament, thereby completing the connection.

The fixed contact 255 is connected through a resistance 250 which may have a value of 90,000 ohms to a conductor 257, which leads to fixed contact 258. Contact 258 is connected through resistance 259 of 5000 ohms and conductor 260 to the negative binding post 116 of the standard cell 26. The positive binding post 117 is connected by conductor 261 to one contact 262 of the grid test switch actuated by push button 51. The other contact 263 of the grid test switch is resiliently urged to open position and is connected by a conductor 264 to resistance 265, which may be of a value of 1000 ohms. The other terminal of resistance 265 is connected by conductor 266 to the conductor 260.

The bush button 49 may be actuated to close contacts 245, 255 to indicate the grid voltage on the D. C. voltmeter 37 on the 100 volt scale, and the circuit for this measurement may be traced from the grid contact of the socket to the cathode of the socket, as follows: 73, 267, 268, 104, 105, 269, 264, 265, 266, 260, 259, 257, 256, 255, 245, 242, 240, 237, 235, 233, 232, 234, 236, 241, 253, 254, 173, 71. When an appropriate adapter having five prongs and four female contacts is placed in the socket 53, the cathode contact 71 is connected in the adapter to the heater contact 75 or when the four contact socket 54 is utilized, the circuit may be traced from cathode 71 to filament contact 64 through conductor 270. The D. C. voltmeter 37 will thus indicate the voltage between the grid and the cathode of a five prong tube, or between the grid and filament of a four prong tube.

In the case of battery operated sets, if the filament voltage was read without the use of the reversing switch, the grid voltage reading is the true grid voltage to the positive end of the filament, and the grid voltage to the other or negative end of the filament may be calculated by subtracting the filament voltage of the tube in the tester. If, however, the filament voltage was read with the reversing switch closed, then the grid voltage reading is the true voltage to the negative end of the filament.

The grid voltage may also be read on the 10 volt range by pressing the push button 50 and placing the D. C. voltmeter across the grid and cathode or grid and filament, with a multiplying resistance of 10,000 ohms instead of 100,000 ohms, as in the preceding case.

In order to permit the use of the D. C. voltmeter 37 for external circuits, the binding post 124 is connected by a conductor 230 to the conductor 210 which leads to conductor 247. The binding post 125 is connected by a conductor 194 to the cathode lead 173 which is connected through resistance 254, conductor 253 and reversing switch 52 to the D. C. voltmeter 37. The binding posts 124 and 125 are thus adapted to be used as negative and positive binding posts for the measurement of voltages on the 10 and 100 volt ranges of the D. C. voltmeter 37, by means of the push button switches 47 and 48.

The grid test push button 51 is adapted to be used for placing a predetermined additional electromotive force on the grid, the change in grid voltage producing a corresponding change in plate current, which is a measure of the worth of the tube. The grid test switch has been arranged for use with ordinary audion tubes or tubes of the screen grid type, and the circuits for the grid test of an ordinary tube will be described first.

When the plug 24 is placed in the socket of a receiving set and the corresponding tube is placed in the socket 53 or 54, the filament and cathode in the former case are energized directly from the socket of the receiving set through the conductors 173, 174 and 175. The grid contact 130 of the plug 24 is connected by a conductor 271 to one of the contact springs 99 of the long lead switch, which is normally engaged with the contact 100. The contact 100 is connected by a conductor 272 to the conductor 260, which is connected to conductor 266, resistance 265, conductor 269 and contact 105 of the short lead switch. The contact 105 is normally engaged with contact 104, which is connected by conductor 268 and conductor 267 to the grid contact of the socket 53 or socket 54. The grid of the tube in the tester socket is thus also energized and provided with a predetermined potential derived from the socket of the receiving set.

The plate of the tube in the socket 53 or 54 is also energized from the receiving set, the circuit being traced from the plate contact of the plug to that of the socket, as follows: contact 132, 183, 182, 196, milliameter 36, 202, 201, 203, 204, 73.

The standard cell 26 is adapted to be shunted across the resistance 265 by actuating the push button 51. Normally, the resistance 265 is in the grid circuit which extends from the grid contact 130 of the plug to the grid contact 73 of the socket, but the resistance 265 does not produce an appreciable drop in the grid voltage on account of the relatively small value of the grid current. When the push button 51 is actuated, closing contacts 262 and 263, the parallel circuit, including the standard cell 26 and resistance 265, may be traced as follows: from the binding post 116 to binding post 117; 116, 260, 266, 265, 264, 263, 262, 261, 117.

The potential drop across the resistance 265 is then equal to the potential of the standard cell and the grid switch 51 is thus adapted to impress an additional potential of a standard value as, for example, four and one-half volts upon the grid circuit without breaking the grid circuit or interrupting the operation of the radio receiving set. The change in grid voltage may be indicated upon the 10 volt scale or 100 volt scale of the D. C. voltmeter 37 and the corresponding change in plate current will be indicated on the D. C. milliammeter 36.

Since the grid voltage is changed a standard amount, it is not necessary to note the change in grid voltage, provided the voltage of the cell 26 has been checked and the worth of a tube may be determined by merely reading the change in plate current in milliamperes. This change in plate current may be checked with a standard which gives the normal change in plate current in milliamperes for various types of tubes when the tubes are operated at a predetermined plate voltage. An exemplary standard table is given as follows:

*Normal changes in plate current in milliamperes when grid test button is pressed*

| Type of tube | | Plate voltage | | | | |
|---|---|---|---|---|---|---|
| | | 22.5–45 | 67.5 | 90 | 135 | 157–180 |
| WD-11-12 | C-11-12 | 1.50 | 1.58 | 1.90 | | |
| UV, UX-199 | C, CX-299 | 1.40 | 1.67 | 1.83 | | |
| UX-112-A | CX-112-A | | | 6.60 | 7.40 | 7.48 |
| UX-120 | CX-220 | | | 1.88 | 2.20 | |
| UX-171-A | CX-371-A | | | 5.28 | 5.98 | 6.38 |
| UX-200-A | CX-300-A | 2.95 | | | | |
| UX-201-A | CX-301-A | 1.90 | 2.50 | 3.20 | 3.35 | |
| UX-210 | CX-310 | | | | | 4.84 |
| UX-222 | CX-322 | | 1.14 | 1.18 | 1.23 | |
| UX-224 | CX-324 | | | | 2.5 | 3.0 |
| UX-226 | CX-326 | | | 3.83 | 3.83 | 3.83 |
| UX-227 | CX-327 | | | 3.19 | 3.60 | 3.83 |
| UX-240 | CX-340 | | | .88 | .88 | .88 |
| UX-245 | CX-245 | | | | | 8.00 |

The present testing device is also capable of indicating the electrical conditions existing at the socket of any tube when the radio receiving set is operating, and consequently the plate voltage, grid voltage and plate current, can be determined for any tube in the set under operating conditions. Variation from normal plate current, the filament voltage being normal, is usually caused by incorrect grid voltage for the plate voltage being used. In other words, it is not always necessary that the plate voltage be kept at any predetermined exact value, so long as the grid voltage is properly proportioned to it.

The question whether the grid voltage is properly proportioned to the plate voltage, and whether the plate current is proper in value, may be determined from a convenient standard table giving the plate voltages and corresponding grid voltages and plate currents for each type of tube, and the plate voltage having been determined, the proper grid voltage may be determined from the table or by interpolation, to ascertain the condition of the parts of the receving set and locate the trouble.

An exemplary standard table showing the proper relations between the plate volts, grid volts and grid current, is given as follows:

*Relation of plate volts, grid volts, and plate current of various tubes used as amplifiers*

| Type of tube | Plate volts | Grid volts | Plate current |
|---|---|---|---|
| 199 | 45 | 1.5 | 1.0 |
|  | 67.5 | 3.0 | 1.7 |
|  | 90 | 4.5 | 2.5 |
| 120 | 90 | 16.5 | 3.2 |
|  | 135 | 22.5 | 6.5 |
| 201-A | 67.5 | 3.0 | 1.7 |
|  | 90 | 4.5 | 2.5 |
|  | 135 | 9.0 | 3.0 |
| 226 | 90 | 6 | 3.5 |
|  | 135 | 9.0 | 6.0 |
|  | 180 | 13.5 | 7.5 |
| 227 | 90 | 6.0 | 3.0 |
|  | 135 | 9.0 | 5.0 |
|  | 180 | 13.5 | 6.0 |
| 112-A | 135 | 9.0 | 7.0 |
|  | 157 | 10.5 | 10.0 |
|  | 180 | 13.5 | 10.0 |
| 171-A | 135 | 27.0 | 16.0 |
|  | 157 | 33.0 | 18.0 |
|  | 180 | 40.5 | 20.0 |
| 245 | 180 | 34.5 | 26 |
|  | 250 | 51.5 | 32 |
| 210 | 250 | 18 | 12 |
|  | 350 | 27 | 16 |
|  | 425 | 35 | 20 |
| 250 | 300 | 54 | 35 |
|  | 350 | 63 | 45 |
|  | 400 | 70.5 | 55 |
|  | 450 | 84.0 | 55 |
| 222 | 135 With 45 volts on screen grid | 1.5 | 1.5 |
| 224 | 180 With 75 volts on screen grid | 1 5 | 4 |

Figure 1:
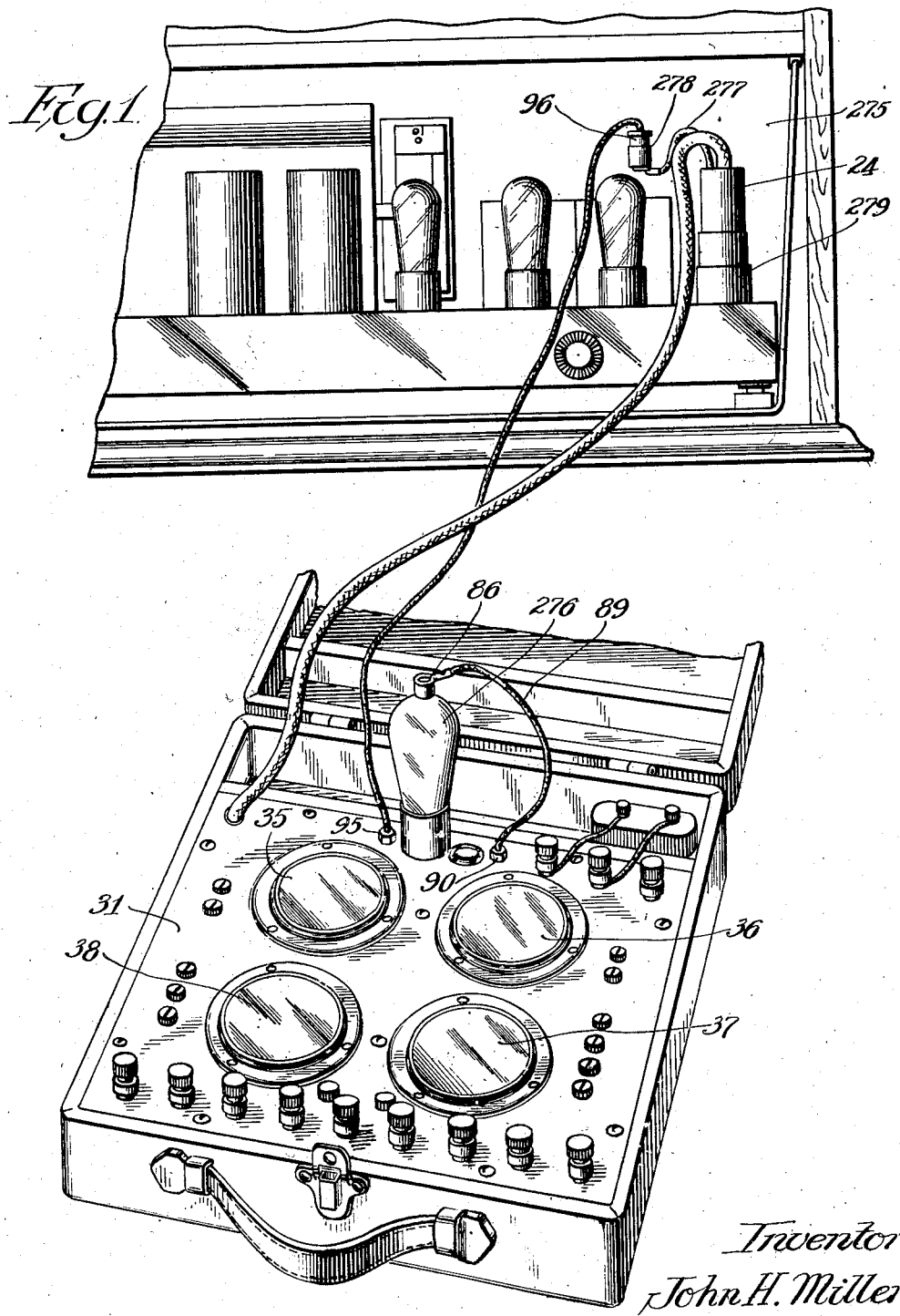
Fig. 1 is a fragmentary elevational view of one of the testing devices, showing its use on a receiving set with a screen grid tube.

Referring to Fig. 1, the testing device is illustrated in this figure in the act of testing a radio set having a screen grid tube. The radio receiving set 275 having a screen grid tube 276, is provided with the short lead 277 having the female connector 278. The tube 276 is removed from the receiving set and placed in the socket 53 and the plug 24 is placed in the socket 279 of the receiving set, thereby energizing the testing device and tube 276 from the energy sources of the receiving set.

The long lead has its connector 95 inserted in the socket 83, and thereby connected with the contact 100, the circuit being broken between contacts 99 and 100 and the circuit being made between contacts 101 and 102. The other end of the long lead has its connector 96 connected with the connector 278 of the screen grid lead on the receiving set 275. The short lead 89 has its cap 86 connected with the corresponding electrode terminal at the top of the screen grid tube 276 and the connector 90 of the short lead is inserted in the socket 84, engaging the contact 105 and breaking connection between the contacts 104 and 105.

The socket and plug arrangement, and the circuits, may thus be conveniently changed from that necessary for the test of an ordinary audion tube, to that required for the testing of screen grid tubes, and when the parts are arranged as shown in Fig. 1, the circuit connections have been so changed that the grid test may also be applied to the screen grid tube.

The operation of changing these connections will now be described in detail.

In testing an ordinary five prong tube, the control electrode is the grid electrode which is connected to the contact 73 of the socket and which corresponds to the contact 130 of the plug. In the screen grid type of tube, the electrode which is connected to the terminal at the top of the tube becomes the control electrode, and consequently the circuits should be so changed that an appropriate voltage is applied to the ordinary grid prong and the grid test voltage should be applied to the electrode, which is connected to the upper terminal of the screen grid tube.

For this purpose, the lead 271 which extends from the grid contact 130 of the plug, is connected through the contacts 99 and 100 to the conductor 260, conductor 266 and resistance 265, which is used in impressing an additional increment of voltage on the control grid. When the long lead connector 95 is inserted in the socket 83, the connection between contacts 99 and 100 is broken and the conductor 271 disconnected from the resistance 265.

Referring to Fig. 4, it will also be noted that the conductor 276 leading from the socket grid contact 73 is connected to conductor 268, which leads to contact 108 normally on open circuit with respect to contact 101. Contact 101 is connected to conductor 271, which leads back to a plug grid contact 130. When the long lead connector 95 breaks connection between the contacts 99 and 100 and disconnects the plug grid terminal from the resistance 265, it also makes contact between contacts 101 and 102, thereby directly connecting a plug grid prong to the socket grid contact 73 and the circuit may be traced as follows: 130, 271, 101, 102, 268, 267, 73.

The upper terminal of the screen grid tube normally is energized from the lead 277 and cap 278 of the receiving set and since the plug and cable merely establish connection with the contacts of socket 279 the long lead is also necessary to establish a connection between the screen grid lead 277 of the receiving set and the testing device. The connection between the connector 95 and the contact 100, connects the screen grid lead of the receiving set to the circuits of the testing device and resistance 265, in such manner that the additional increment of electromotive force, which is supplied by the standard cell 26 and the resistance 265, may be inserted in the circuit of the control electrode of the screen grid tube.

Referring to the normal connections which are shown in Fig. 4, for an ordinary five prong tube it will be noted that the circuit may be traced from the grid contact 73 of the socket through the short lead switch contacts 104 and 105 to the lower side of resistance 265, as follows: 73, 267, 268, 104, 105, 269, 264, 265.

When the short lead is inserted in the socket 84, connection is broken between the contacts 104 and 105 and the grid contact 73 of the socket is disconnected from the lower side of resistance 265 of Fig. 4. At the same time the connector 90 engages the contact 105 and the control electrode of the screen grid tube in the socket 53 is connected to the lower side of resistance 265, the circuit being traced as follows: 265, 264, 269, 105, connector 90, lead 89, cap 86, tube 276.

It will thus be observed that the insertion of the short lead and long lead connectors in the testing device breaks the circuits which normally connect the grid test switch and standard cell to the ordinary grid prong and corresponding contact of the socket 53, and at the same time a direct connection is established between the grid prong of the plug and the grid contact of the socket, and the grid test switch, resistance and standard cell are applied to the circuit which includes the control electrode of the screen grid tube.

The present device is thus not only enabled to test receiving sets having screen grid tubes, but it is capable of impressing an additional increment of electromotive force from the standard cell on the control grid of the screen grid tube and the changes in plate current in milliamperes in the screen grid tube when the grid test button is pressed, may be checked with the standard table provided.

The present testing device is also preferably provided with an auxiliary binding post 118 which is connected by conductor 280 to the conductor 253.

The present testing device is preferably provided with a number of accessories including the continuity test leads 281, 282 shown in Fig. 15. These continuity test leads are preferably provided with spade test connectors 283 electrically connected with the flexible wires inside the insulating covering of the leads 281, 282, and the insulating covering of the leads preferably extends into the bores 284 of the insulating handles 285.

The flexible wires 286 are connected to the cord tips 287, which consist of elongated rods, each fixedly mounted in one of the bores 84 of the insulating handles or tubes 285, and secured therein by transverse pins 288. The ends of the cord tips may be provided with a reduced portion 289 adapted to fit in the apertures which are usually provided in the binding posts 116—127, while the diameter of the rod 287 may be such that it is adapted to engage the female contact of any ordinary electron tube socket. The cord tips 287 are also provided with relatively sharp points 290 adapted to penetrate relatively thin layers of insulation, dirt or grime and establish a good electrical connection with the various parts of the circuit, the continuity of which is to be tested. The continuity test leads 281 and 282 are placed with their spade lugs 283 in connection with the binding posts 117 and 118, respectively, and the cord tips 287 are used for establishing a connection with the circuit to be tested for continuity.

When the cord tips 287 are touched together, the standard cell 26 is short-circuited through the D. C. voltmeter 37, provided the "grid 10 volt" switch actuated by push button 50 is closed. The push button 50 should then be pushed down and turned to lock the contacts 246, 258 in closed position in taking continuity tests, and the circuit may be traced from one continuity test lead to the other, as follows: test lead 282, binding post 117, standard cell 26, binding post 116, 260, 259, 258, 246, 242, 240, 237, 235, 233, 37, 232, 234, 236, 241, 280, 118, 281.

The ten volt range of the D. C. voltmeter is thus placed in series with the continuity leads and the reversing switch, and if desired, the reversing switch may be used to make the meter read directly, but ordinarily the application of the continuity test leads would merely be reversed. An indication of 4.5 volts under these circumstances, corresponds to a reading of 90 on the meter as set forth in the instruction book, since the meter is placed in series with the 5000 ohm resistance 259 and the 5000 ohm resistance 254. As the resistance between the cord tips is increased, the reading on the meter will decrease until the meter is on open circuit, when it will read zero, and the continuity of any circuit may be very readily determined to ascertain whether there are any breaks in the circuit, loose connections or other abnormal conditions.

Referring to Fig. 14, this is an illustration of another accessory, preferably provided with the testing device for checking the line voltage of the ordinary lighting circuit in the testing of a radio receiving set. The continuity test leads 281 and 282 may be used with the various binding posts, and appropriate ranges of the meters for testing the condition of a battery operated set or testing the voltages applied by any source of power, but the test leads of Fig. 14 are particularly adapted to be used with a lighting circuit. These test leads 291, 292, comprise a multiplicity of fine flexible wires with an insulating rubber covering and a braided cloth covering, the wires being connected at one end to a standard wall connection plug 292 having contact prongs 294 and 295 for engagement with the female contacts of a wall socket. The opposite ends of the leads 291 and 292 are provided with cord tips 296, 297 which may be similar in form to the cord tips on the continuity test leads, but which are preferably provided with relatively short insulating handles 298, 299.

The long handles 285 of the continuity test leads are convenient in reaching relatively inaccessible circuits with the cord tips 287, but the handles 298, 299 are merely used for assuring the prevention of a short-circuit and for handling the relatively high voltage cord tips 296, 297.

The lead 291 is preferably shorter than the lead 292 by such an amount that the cord tip 296 only reaches to the insulating handle 299 and the leads 291 and 292 are preferably twisted together or covered with a braided covering from the plug 293 to a point 300 adjacent the handle 298. At the point 300 the leads 291 and 292 are wrapped with thread 301, or otherwise permanently secured together so that the relatively short and separate lengths of the leads 291 and 292 are so short and stiff that the cord tips 296 and 297 cannot be brought into contact with each other, except by a special effort to do so. The attachment of the leads 291, 292 to each other at the point 300 and the unequal lengths of the leads, thereby serves to effectively prevent short-circuiting of the test leads 291, 292, thereby preventing the short-circuiting of the lighting circuit and blowing out of the fuse.

The adapter shown in Fig. 16 may be used with the five prong test plug 24 to convert the test plug into a four prong plug, since one of the female contacts of the adapters, namely the cathode contact, is connected to one side of the filament in the adapter.

The adapter shown in Fig. 17 is provided with five prongs and four female contacts, for the purpose of converting a five contact socket into a four contact socket, but in this case, the male prongs corresponding to the filament grid and plate are directly connected to the corresponding female contacts, while the contact prong which corresponds to a separate cathode is not connected and may be eliminated from the adapter, if desired.

Referring to Figs. 18 and 19, these comprise a plan view of a two meter testing device, and the wiring circuit for the same, which is capable of performing most of the same functions as the testing device previously described.

The left-hand meter 38 of this device, preferably comprises an A. C. voltmeter having scales of 0–4, 0–8, 0–16, 0–160, 0–800 volts. This corresponds to the A. C. voltmeter 38 of the previous embodiment and the correspond- parts which may be identical in structure and function, have been given the same reference numerals. Thus, the panel 31 of this device is also provided with a push button 42 for measurement of four volt A. C. filaments, push button 43 for 8 volt A. C. filaments, push button 44 for sixteen volt A. C. filaments. The binding posts 119, 120 are the 160 volt A. C. binding posts, and the binding posts 120, 121 are the 800 volt A. C. binding posts.

The right-hand meter 302 preferably consists of a direct current milliammeter which may also be used as a voltmeter, and it is preferably provided with the following scales, 0–6, 0–12, 0–30. The foregoing scales may be used for either voltage readings or milliamperes, and in order to indicate the proper relation of the scale divisions to the values being measured, the following indicia appear on the scale:

Read 120 volts on 12 scale
Read 600 volts on 6 scale
Read 60 V. or milliamperes on 6 scale
Read 300 V. or milliamperes on 30 scale.

The single instrument 302 thus performs a plurality of different functions with a degree of accuracy which is sufficient for practical purposes, although the provision of a plurality of instruments 35, 36, 37 for direct current measurements as shown in Fig. 2, is preferable, because the ranges of the instrument may be more closely related to the measurements desired. A measurement may be made more accurately when it can be made on the largest scale available, and therefore a testing device having scale ranges particularly adapted for every need, will accomplish the most accurate results, but the scale provided in the device of Fig. 18 is calibrated so that it may be used on all of the various ranges for the purpose of measurement of direct current filament voltage, plate voltage, grid voltage, cathode voltage, and plate current.

The D. C. voltmeter 302 is again preferably provided with a reversing switch 52 and the device also has a grid test switch and push button 51 adapted to operate as in the preceding embodiment. The D. C. filament voltage button 48 bears the indicia "Fil. 6 V. D. C." to correspond with the six volt scale of meter 302, and a plate voltage button 303 for the 600 volt range has been added.

The plate voltage buttons 40 and 41 bear the same indicia as in the preceding embodiment, but the grid voltage buttons 49 and 50 bear the indicia "Grid 120 V" and "Grid 30 V" to correspond to the scale divisions of meter 302.

The plate current, push button 46, bears the same indicia, "Plate 60 M. A." and the plate current button 304 bears the indicia "Plate 12 M. A." in this embodiment, and the indicia "Both 300 M. A." appearing between the two buttons 46, 304, indicates that both buttons should be pressed for use with the 300 milliampere range.

The present testing device merely includes a single tube socket 53 which may be used with the adapters previously described, to convert the five contact socket into a four contact socket, and it is provided with the auxiliary test lead sockets 83 and 84 for the screen grid leads. The binding posts 122, 123, 124, 125, and 126 are the same as in the preceding embodiment, except that the indicia correspond to those used with the push buttons for the corresponding ranges, and with the scale divisions on the meters, and it will be noted that the binding posts 123 and 124 may be used as minus and plus binding posts, respectively, for the 60 volt range of the D. C. meter 302.

The various conductors of the wiring diagram of Fig. 19 have been given numerals corresponding to the numerals of the preceding embodiment, and the operation of the circuits shown in Fig. 19 will be apparent from the description of the preceding device. Exemplary values of the multiplying resistance and shunts used with the device are also set forth on the diagram, but it should be understood that the resistance of the various instruments may be changed within the scope of the invention, and consequently the multiplying resistances may also be appropriately and proportionately changed to accomplish the results desired.

The method of use of the present testing device is an important feature, since the modern radio receivers and other audion tube circuits are so complex that the location of trouble and correction of defects requires a systematic use of the measuring instruments provided in the testing device. This method will now be outlined for the purpose of demonstrating the mode of use of the instruments and enabling the operator to determine the condition of a radio receiving set, so that proper corrective measures may be taken.

Before analyzing the radio set for trouble, the two sources of input to the radio receiving set should be carefully examined and checked for possibilities of trouble. The aerial as a source of broadcast signals, should be examined for grounds, corroded connections, broken lead-in wires, leaky lightning arresters, short-circuits, etc., and the condition of the ground connection or aerial may be determined by disconnecting the aerial and ground to ascertain whether the difficulty in question disappears when these elements are disconnected.

A visual inspection of the wiring connections, soldered joints, wiring insulation, tube socket fingers and other elements of the radio set should be made to locate a possible cause of trouble. The possibility of variable condenser plates touching may be checked by visual inspection, and the failure of electron tubes to light up will also give an indication of the location of trouble.

The power input to the radio set should then be checked by checking the voltages of the batteries if the set is battery operated, by means of the test leads of Fig. 15, or by checking the line voltage of the lighting circuit used as a power supply, by means of the leads of Fig. 14. The lack of a normal supply of voltage to the various circuits in the radio set will change the electrical conditions all through the circuits and apparatus of the receiving set, and in a similar manner, trouble in one of the stages may change the electrical conditions in every succeeding stage. If the power supply is below the proper voltage, it should be corrected by recharging or replacing the batteries or by adjusting the line voltage with the voltage adjustment usually provided on the receiving set.

The electrical conditions throughout the radio receiving set should then be tested from the input end to the output or loud speaker, and conditions corrected so far as possible to correspond to the normal conditions desired before proceeding beyond the source of trouble.

The rectifier filament voltage may be checked by using a four hole five prong adapter to fit the tube to the analyzer, and a five hole four prong adapter to fit the analyzer plug in the socket of the rectifier tube. With the rectifier tube in the testing device and the plug in the rectifier socket, the radio set should be placed in as near good operating condition as possible, and the electrical test should preferably be made with a volume control in the maximum volume position, since this position generally gives the optimum distribution of currents and voltages throughout the various circuits of the radio set. The set should be tuned to the incoming signals of a broadcast station or oscillations should be applied from a separate source of oscillations and the receiving set operated with the tube in the testing device.

The filament voltage of the rectifier tube may then be read on the lower left-hand meter by pressing the 8 V. A. C. filament button 43 and the plate current may be determined by pressing the 300 milliampere plate button 45. If the current so obtained is less than 60 milliamperes, the 60 M. A. button should be used, and the current reading will be the total current passing through a half-way rectifier or one-half the total plate current passing through a full wave rectifier.

It should be observed that while the most valuable tests are made with the tube in the socket of the testing device, the device is also capable of reading the open circuit voltage applied to the tube, and these voltages may be determined by taking the readings with the tube removed from the socket of the testing device.

The data secured from the test carried out by the present testing device, is preferably recorded and correlated for analysis and comparison with standard analysis charts that are provided in the instruction book which accompanies the testing device, and in order to illustrate the manner of recording the data and the order in which the tests should preferably be taken, an exemplary analysis chart is given as follows:

OWNER  Mr. John Doe,     DATE
ADDRESS  Chicago, Illinois
NAME OF SET  ------Company, Model 55 A.C.

| TUBE NO. IN ORDER (1) | TYPE OF TUBE (2) | POSITION OF TUBE 1ST R.F. DET., ETC. (3) | READINGS, PLUG IN SOCKET OF SET | | | | | | | | | |
|---|---|---|---|---|---|---|---|---|---|---|---|---|
| | | | TUBE OUT | | TUBE IN TESTER | | | | | | | |
| | | | A VOLTS (4) | B VOLTS (5) | A VOLTS (6) | B VOLTS (7) | C VOLTS (CONTROL GRID) (8) | CATHODE-HEATER VOLTS (9) | NORMAL PLATE M.A. (10) | PLATE M.A. GRID TEST (11) | PLATE CHANGE M.A. (12) | SCREEN GRID VOLTS (13) |
| 1 | 280 | Rect. | 4.3 | - | 4.1 | - | - | - | 52 | - | - | - |
| 2 | 224 | 1st RF | 2.15 | 152 | 2.1 | 140 | 3 | 3 | 2.6 | 5.6 | 3 | 76 |
| 3 | 224 | 2nd RF | 2.15 | 152 | 2.1 | 140 | 3 | 3 | 2.6 | 5.6 | 3 | 76 |
| 4 | 227 | Det. | 2.15 | 84 | 2.1 | 82 | 14 | 14 | 1 | - | - | - |
| 5 | 227 | 1st A | 2.15 | 140 | 2.1 | 80 | 3 | 3 | 2.1 | 3 | .8 | - |
| 6 | 245 | 2nd A | 2.4 | 228 | 2.45 | 208 | 38 | - | 22 | 26 | 4 | - |
| 7 | 245 | 2nd A | 2.4 | 228 | 2.45 | 208 | 38 | - | 22 | 26 | 4 | - |
| 8 | | | | | | | | | | | | |
| 9 | | | | | | | | | | | | |
| 10 | | | | | | | | | | | | |

LINE VOLTAGE 106   SET ON ___ VOLT TAP.   VOLUME CONTROL POSITION Maximum
SUGGESTIONS OR CHANGES MADE
BY The radio set serviceman is supplied with a pad of analysis blanks of the type exemplified above, and each tube in the set should be tested in the succession named, beginning with the rectifier tube. The number of the type of tube should be entered in column 2; the position of the tube should be entered in column 3, such as first radio frequency, detector, or otherwise. Columns 4 and 5 are intended for the filament voltage and plate voltage with the tube removed from the testing device.

The balance of the columns are used for data taken with the tube in the testing device and the plug in the socket of the receiving set, and the receiving set under operation, preferably with maximum volume.

Column 6 is intended for the filament voltage under operating conditions; column 7 for the plate voltage; column 8 for the control voltage; column 9 for the cathode heater voltage; column 10 for the normal plate current; column 11 for the plate current when the grid test button is pressed. Column 12 is derived by subtracting the values of column 10 from those of column 11, and column 13 is intended for the screen grid voltage.

The voltage and current conditions having been determined in the radio receiving set under operating conditions, and systematically recorded and correlated, the operator may study the data and compare it with standard data for receiving sets of the same model, manufactured by the same company. A large number of standard analysis charts, with the proper values for voltage and current conditions in the set under predetermined line voltage, are given in the instruction book, the data set forth in the chart given above, being exemplary of one of the standard charts.

The relative values of the plate voltage, grid voltage and plate current under normal conditions, may be compared with those set forth in the table previously given for this purpose, and the absence of proper voltage on any of the electrodes may be ascertained and corrected. If any of the electron tubes do not show a change in plate current comparing measurably with the changes set forth in the table provided for the normal changes of plate current in the grid test, the defective tube may be replaced and new readings made of the succeeding stages to ascertain whether the correction of the defective tube has not removed all difficulty.

Open circuits will give a corresponding indication in the data recorded on the analysis chart, and the systematic checking of the electrical conditions from the input to the output end of the receiver, with the correction of defects from the input end to the output end, enables the operator systematically to locate and remedy defects which would otherwise be very difficult to locate.

The testing device may also be employed for checking the capacity of the condensers, testing the continuity of the circuits, checking the resistance of the circuits, checking the resistance of the grid leak and for locating defects in the loud speakers and other auxiliary equipment used with the audion tube circuit.

It will thus be observed that I have invented an improved testing device for determining the electrical conditions existing in a radio set or other audion tube circuit under operating conditions and for testing the audion tubes. The present device is equally adapted to be used for testing circuits employing screen grid tubes, as well as ordinary amplifier tubes, detectors, rectifiers and all of the auxiliary apparatus which is used with audion tube circuits.

The electrical instruments employed in the testing device are utilized for a considerable number of different functions, and all of the respective ranges of the instruments are brought out to auxiliary binding posts, so that each of the instrument ranges may be used separately, if desired. The improved method of determination of the electrical condition of the receiving set and the systematic analysis and correction of defects to bring the electrical conditions to a predetermined standard, is a very efficient and effective method of servicing radio receivers or other audion tube circuits, and defects in the receiving set are readily located and corrected, so that sets may be maintained in condition for the best service.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a testing device for electron tube circuits, the combination of a tester plug having contact prongs corresponding to the terminals of an electron tube, with a flexible conductor cable having conductors leading from said contact prongs, electron tube socket contacts energized through said conductors, an electrical voltage measuring instrument for measuring voltage conditions at the socket of an electron tube circuit, and auxiliary voltage leads in said cable and connecting said instrument and predetermined tester plug contact prongs to eliminate error due to the potential drop in the cable conductors under load.

2. In a testing device, the combination of a plurality of electrical measuring instruments with a test plug having a plurality of contact prongs with a test cable having conductors leading from said contact prongs, a molded insulating panel for supporting said instruments, said cable passing through an aperture in said panel, a boss formed on said panel about said aperture, said conductors being spread radially on said boss, and clamping means for clamping said conductors against said boss.

3. In a testing device, the combination of a molded insulating panel, having a plurality of instrument apertures, a plurality of electrical instruments carried by said panel in said apertures, said panel being provided with a plurality of push button apertures, push buttons in said apertures and projecting above said panel, said panel being formed with a supporting boss, and a switch strip carried by said boss and having a plurality of resilient contacts located for engagement with said push buttons to control said instruments.

4. In a testing device, the combination of a molded insulating panel, having a plurality of instrument apertures, a plurality of electrical instruments carried by said panel in said apertures, said panel being provided with a plurality of push button apertures, push buttons in said apertures and projecting above said panel, said panel being formed with a supporting boss, a switch strip carried by said boss and having a plurality of resilient contacts located for engagement with said push buttons to control said instruments, an insulating member clamping said switch strip on said boss, and a plurality of fixed contacts carried by said insulating member.

In witness whereof, I hereunto subscribe my name this 24th day of March, 1931.

JOHN H. MILLER.